(12) United States Patent
Kimura et al.

(10) Patent No.: US 9,882,597 B2
(45) Date of Patent: Jan. 30, 2018

(54) COMMUNICATION SYSTEM, TUNER, AND SETTING METHOD

(71) Applicants: Arinobu Kimura, Toyota (JP); Tomotsugu Sekine, Nagoya (JP)

(72) Inventors: Arinobu Kimura, Toyota (JP); Tomotsugu Sekine, Nagoya (JP)

(73) Assignees: TOYOTA JIDOSHA KABUSHIKI KAISHA, Aichi-ken (JP); DENSO CORPORATION, Aichi-ken (JP)

( * ) Notice: Subject to any disclaimer, the term of this patent is extended or adjusted under 35 U.S.C. 154(b) by 0 days.

(21) Appl. No.: 14/772,653

(22) PCT Filed: Mar. 10, 2014

(86) PCT No.: PCT/IB2014/000263
§ 371 (c)(1),
(2) Date: Sep. 3, 2015

(87) PCT Pub. No.: WO2014/140711
PCT Pub. Date: Sep. 18, 2014

(65) Prior Publication Data
US 2016/0013830 A1     Jan. 14, 2016

(30) Foreign Application Priority Data
Mar. 11, 2013   (JP) .................. 2013-048228

(51) Int. Cl.
*H04B 1/40* (2015.01)
*B60R 25/00* (2013.01)
(Continued)

(52) U.S. Cl.
CPC ............... *H04B 1/40* (2013.01); *B60R 25/00* (2013.01); *G07C 9/00182* (2013.01);
(Continued)

(58) Field of Classification Search
USPC ................................. 455/77; 340/5.72, 13.24
See application file for complete search history.

(56) References Cited

U.S. PATENT DOCUMENTS 5,614,891 A * 3/1997 Zeinstra .................. B60R 1/088
                                                          340/12.24
5,699,055 A * 12/1997 Dykema ................ G08C 17/02
                                                          340/13.24
(Continued)

FOREIGN PATENT DOCUMENTS

CN         1202048 A      12/1998
CN         102292509 A    12/2011
(Continued)

*Primary Examiner* — Nay A Maung
*Assistant Examiner* — Erica Fleming-Hall
(74) *Attorney, Agent, or Firm* — Sughrue Mion, PLLC

(57) ABSTRACT

A mobile device includes a signal generating unit that generates a first signal and a transmitting unit that wirelessly transmits the first signal generated by the signal generating unit. The first signal includes frequency information that is used in wireless communication between the mobile device and a tuner. The tuner includes a setting processing unit that sets a receiving frequency of an antenna and a demodulation frequency of a phase synchronization circuit. The setting processing unit sets the receiving frequency and the demodulation frequency on the basis of the frequency information included in the first signal from the mobile device.

5 Claims, 6 Drawing Sheets

(51) Int. Cl.
*G07C 9/00* (2006.01)
*H04B 1/18* (2006.01)

(52) U.S. Cl.
CPC ..... *B60R 2325/105* (2013.01); *B60R 2325/20* (2013.01); *G07C 2009/00841* (2013.01); *H04B 1/18* (2013.01)

(56) References Cited

U.S. PATENT DOCUMENTS

| | | | | |
|---|---|---|---|---|
| 6,353,776 B1* | 3/2002 | Rohrl | ................ | G07C 9/00309 340/426.16 |
| 2004/0183714 A1* | 9/2004 | Yamashita | ......... | G07C 9/00309 342/70 |
| 2006/0232376 A1* | 10/2006 | Blaker | .................... | B60R 25/24 340/5.22 |
| 2007/0021082 A1* | 1/2007 | Okumura | ............ | B60C 23/0408 455/142 |
| 2007/0133994 A1* | 6/2007 | Chi | ........................ | G08C 17/02 398/115 |
| 2008/0186132 A1* | 8/2008 | Ikeo | ........................ | B60R 25/24 340/5.7 |
| 2010/0194481 A1* | 8/2010 | Hase | ..................... | H03F 1/0272 330/310 |
| 2010/0216417 A1* | 8/2010 | Terada | ................... | H04H 20/61 455/179.1 |
| 2011/0109432 A1* | 5/2011 | Kim | ........................ | B60R 25/00 340/5.64 |
| 2011/0237194 A1* | 9/2011 | Kojima | ................ | A41D 13/018 455/41.3 |
| 2011/0282520 A1 | 11/2011 | Nakashima et al. | | |
| 2013/0076288 A1* | 3/2013 | Tsuchiya | ................ | G05B 11/26 318/599 |

FOREIGN PATENT DOCUMENTS

| | | |
|---|---|---|
| JP | 07-283694 A | 10/1995 |
| JP | 09100767 A | 4/1997 |
| JP | 2006-333006 A | 12/2006 |
| JP | 2010-242304 A | 10/2010 |
| WO | 2004/043750 A2 | 5/2004 |

* cited by examiner

FIG. 4

| USAGE FREQUENCY INFORMATION | SETTING CONSTANT INFORMATION |
|---|---|
| ⋮ | ⋮ |
| 314.0 | A |
| 315.0 | B |
| ⋮ | ⋮ |

FIG. 8

| USAGE FREQUENCY INFORMATION | SETTING CONSTANT INFORMATION | | |
|---|---|---|---|
| ⋮ | ⋮ | | |
| 314.0 | $\alpha_1$ | $\alpha_2$ | $\alpha_3$ |
| 315.0 | $\beta_1$ | $\beta_2$ | $\beta_3$ |
| ⋮ | ⋮ | | |

COMMUNICATION SYSTEM, TUNER, AND SETTING METHOD

BACKGROUND OF THE INVENTION

1. Field of the Invention

The invention relates to a communication system.

2. Description of Related Art

There is known the function of a vehicle, which allows doors of the vehicle to be locked or unlocked and an engine to be started without using a mechanical key. This function is also called smart system.

In the smart system, communication is carried out between a mobile device (key) and an electronic control unit (ECU) or body control module (BCM) mounted on the vehicle. The mobile device that has received a request signal from the vehicle transmits a response signal. The response signal is received by the tuner of the vehicle and is verified by a verification electronic control unit. When communication has been established between the mobile device and the electronic control unit or body control module, it is allowed to lock or unlock the doors and to start the engine.

There is known a radio receiver that detects a current location of a vehicle and automatically sets its receiving specifications to specifications that match an area to which the current location belongs (for example, see Japanese Patent Application Publication No. 2006-333006 (JP 2006-333006 A)).

Tuners that receive radio waves from mobile devices each have a frequency that is set in conformity with the radio law of each country. In addition, performance that is required for each tuner depends on a vehicle model on which an antenna is mounted and a mounting condition of the antenna as well.

Thus, tuners are prepared for each destination area and for each vehicle model and each antenna mounting condition. Therefore, there are significantly many part numbers for tuners. In addition, as in the technique described in JP 2006-333006 A, equipping tuners with the function that the receiving specifications are automatically set on the basis of a current location leads to an increase in product cost.

SUMMARY OF THE INVENTION

The invention reduces manufacturing cost and management cost or makes it easy to handle setting of receiving specifications for a communication system that sets the receiving specifications of a tuner, which match radio waves from a mobile device.

An aspect of the invention provides a communication system. The communication system includes: a mobile device and a tuner. The mobile device includes a signal generating unit configured to generate a first signal and a transmitting unit configured to wirelessly transmit the first signal generated by the signal generating unit. The first signal includes frequency information that is used in wireless communication between the mobile device and the tuner. The tuner includes a setting processing unit configured to set a receiving frequency of an antenna and a demodulation frequency of a phase synchronization circuit. The setting processing unit is configured to set the receiving frequency and the demodulation frequency on the basis of the frequency information included in the first signal from the mobile device.

Another aspect of the invention provides a tuner that carries out wireless communication with a mobile device. The tuner includes a setting processing unit configured to set a receiving frequency of an antenna and a demodulation frequency of a phase synchronization circuit on the basis of frequency information that is used in wireless communication between the mobile device and the tuner, the frequency information being included in a first signal from the mobile device.

Further another aspect of the invention provides a setting method for a communication system including a mobile device and a tuner. The setting method includes generating a first signal with the use of the mobile device, the first signal including frequency information that is used in wireless communication between the mobile device and the tuner; wirelessly transmitting the first signal with the use of the mobile device; and setting a receiving frequency of an antenna and a demodulation frequency of a phase synchronization circuit on the basis of the frequency information with the use of the tuner, the frequency information being included in the first signal from the mobile device.

According to the aspects of the invention, it is possible to reduce manufacturing cost and management cost or make it easy to handle setting of receiving specifications for a communication system that sets the receiving specifications of a tuner, which match radio waves from a mobile device.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a view that shows an example embodiment of mapping information;

FIG. 8 is a view that shows a modification example embodiment of mapping information.

DETAILED DESCRIPTION OF EMBODIMENTS

Figure 1:
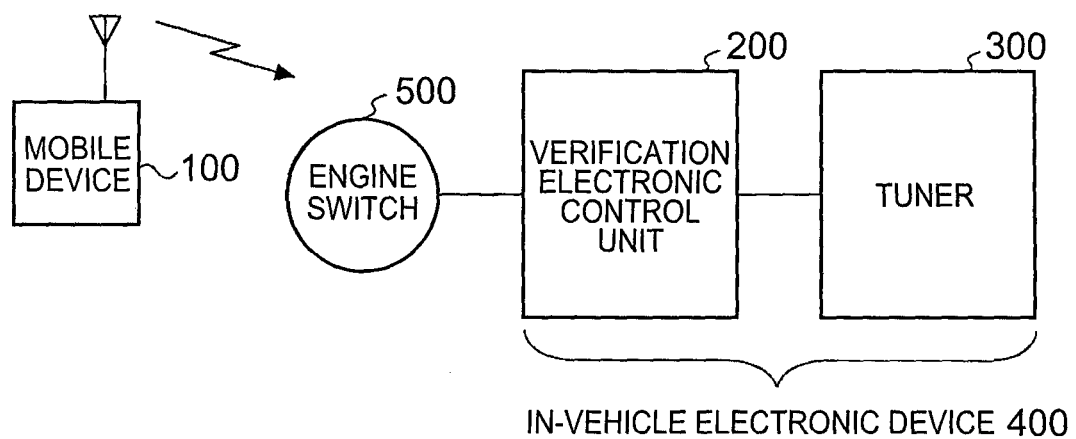
FIG. 1 is a view that shows an example embodiment of a communication system.

An embodiment of the invention will be described with reference to the accompanying drawings on the basis of the following example embodiments. Like reference numerals denote components having the same functions in all the drawings for illustrating the example embodiments, and the overlap description is omitted.

Example Embodiments

Communication System

FIG. 1 shows an example embodiment of a communication system.

The communication system includes a mobile device 100, a verification electronic control unit 200 and a tuner 300. Hereinafter, for the sake of convenience of description, the verification electronic control unit 200 and the tuner 300 may be collectively referred to as an in-vehicle electronic device 400.

The in-vehicle electronic, device 400 is mounted on a mobile unit, such as a vehicle. In the example embodiment of the communication system, the in-vehicle electronic device 400 is mounted on a vehicle. The mobile device 100 may be carried by a user.

The tuner 300 receives a UHF-modulated wireless signal transmitted from the mobile device 100. The UHF-modulated wireless signal may be a response signal to a request signal wirelessly transmitted from the vehicle. The UHF-modulated wireless signal may also be referred to as RF signal. The tuner 300 demodulates the RF signal. The tuner 300 reconstructs the response signal by demodulating the RF signal, and inputs the response signal to the verification electronic control unit 200.

The verification electronic control unit 200 verifies the identifier of the mobile device 100. The identifier is included in the response signal from the tuner 300.

In the example embodiment of the communication system, a frequency used is set between the mobile device 100 and the in-vehicle electronic device 400. A frequency used may be set at the time when the mobile device 100 is cataloged in the in-vehicle electronic device 400. A receiving frequency of an antenna installed in the tuner 300 and a demodulation frequency of a phase synchronization circuit are set on the basis of the frequency used.

Mobile Device 100

Figure 2:
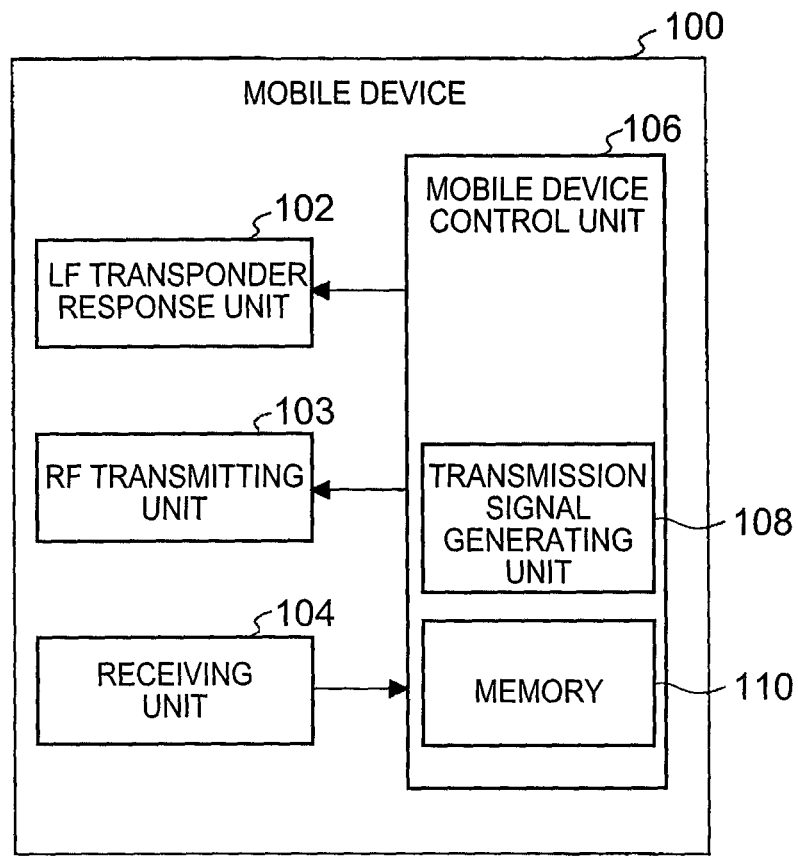
FIG. 2 is a view that shows an example embodiment of a mobile device.

FIG. 2 shows an example embodiment of the mobile device 100.

The mobile device 100 includes an LF transponder response unit 102, an RF transmitting unit 103, a receiving unit 104 and a mobile device control unit 106. The mobile device control unit 106 includes a transmission signal generating unit 108 and a memory 110.

The transmission signal generating unit 108 generates a signal that is transmitted from the mobile device 100 to the in-vehicle electronic device 400. The transmission signal generating unit 108 generates a transmission signal (hereinafter, referred to as "first signal") including information (hereinafter, referred to as "usage frequency information") indicating a frequency that is stored in the memory 110 and that is used by the mobile device 100. The transmission signal generating unit 108 inputs the first signal to the LF transponder response unit 102.

When the request signal from the in-vehicle electronic device 400 has been received by the mobile device 100, the transmission signal generating unit 108 generates a response signal to the request signal. The transmission signal generating unit 108 may generate a response signal including the identifier of the mobile device 100, stored in the memory 110. The transmission signal generating unit 108 inputs the response signal to the RF transmitting unit 103.

The memory 110 stores the usage frequency information of the mobile device 100 and the identifier of the mobile device 100. The memory 110 may be a nonvolatile memory. For example, the memory 110 may be an electrically erasable programmable read-only memory (EEPROM).

The LF transponder response unit 102 is connected to the mobile device control unit 106. When bidirectional (transponder) communication is carried out with the use of LF-band radio waves, the LF transponder response unit 102 modulates the first signal from the mobile device control unit 106 into low frequency (LF)-band radio waves, and wirelessly transmits the radio waves via a transmission antenna. The LF transponder response unit 102 may be used at the time when the mobile device 100 is cataloged in the in-vehicle electronic device 400.

The RF transmitting unit 103 is connected to the mobile device control unit 106. The RF transmitting unit 103 modulates the response signal from the mobile device control unit 106 into RF-band radio waves, and wirelessly transmits the radio waves via the transmission antenna. For example, the RF transmitting unit 103 modulates the response signal into a 300 MHz band or a 400 MHz band, and transmits the response signal.

The receiving unit 104 is connected to the mobile device control unit 106. The receiving unit 104 receives a wireless signal from the in-vehicle electronic device 400. An LF-modulated wireless signal is transmitted from the in-vehicle electronic device 400. The receiving unit 104 demodulates the LF-modulated wireless signal, and inputs the wireless signal to the mobile device control unit 106. When the LF-modulated wireless signal is a request signal, the transmission signal generating unit 108 generates a response signal to the request signal.

Verification Electronic Control Unit 200

The verification electronic control unit 200 may include a micro-controller unit (MCU) (not shown) and a transceiver (not shown).

The micro-controller unit may include one or a plurality of microcomputers. A CPU may be included instead of a microcomputer or a microcomputer and a CPU may be included in combination. In addition, the micro-controller unit may include a communication device. The communication device carries out serial communication with the transceiver. Specifically, the communication device may be a universal asynchronous receiver transmitter (UART).

The transceiver is connected to the micro-controller unit and a communication bus (not shown). The transceiver transmits data, input from the micro-controller unit, to the communication bus, and inputs data from the communication bus to the micro-controller unit.

The verification electronic control unit 200 may include a plurality of the micro-controller units. The verification electronic control unit 200 may include a plurality of the transceivers.

Function of Verification Electronic Control Unit 200

Figure 3:
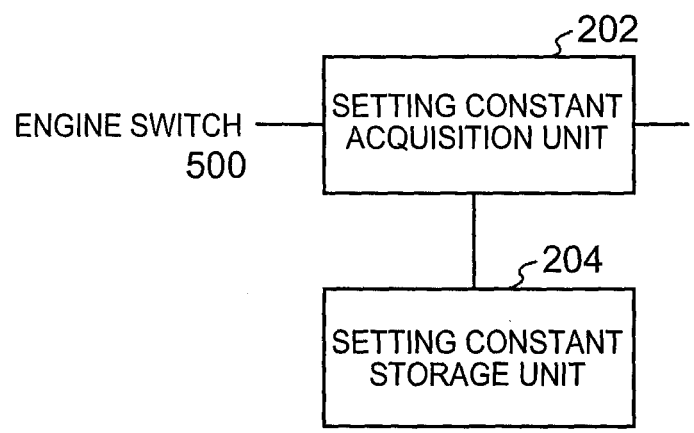
FIG. 3 is a view that shows an example embodiment of a verification electronic control unit.

FIG. 3 is a functional block diagram that shows the verification electronic control unit 200.

Functions shown by the functional block diagram of FIG. 3 are mainly executed by the micro-controller unit. That is, the micro-controller unit functions as a setting constant acquisition unit 202 and a setting constant storage unit 204.

The function of the setting constant acquisition unit 202 and the function of the setting constant storage unit 204 may be executed by the micro-controller unit in accordance with an application (firmware) stored inside the micro-controller unit. Alternatively, the function of the setting constant acquisition unit 202 and the function of the setting constant storage unit 204 may be executed by the micro-controller unit in accordance with an application stored in a storage unit (not shown).

LF-band radio waves from the mobile device 100 are received by an engine switch 500. Before the mobile device 100 is cataloged in the in-vehicle electronic device 400, the receiving frequency of the antenna and the demodulation frequency of the phase synchronization circuit are not set in the tuner 300. Thus, LF-band radio waves from the mobile device 100 cannot be received by the tuner 300. On the other hand, the engine switch 500 is mostly configured to be able to carry out bidirectional (transponder) communication with LF-band radio waves. In the example embodiment of the communication system, LF-band radio waves are received by the engine switch 500. A receiving signal received by the engine switch 500 is input to the verification electronic control unit 200. A communication device that transmits or receives LF-band radio waves may be provided in a device other than the engine switch 500. In this case, the communication device that transmits or receives LF-band radio waves inputs the receiving signal to the verification electronic control unit 200.

The verification electronic control unit 200 functions as the setting constant acquisition unit 202. The setting constant acquisition unit 202 acquires the usage frequency information from the first signal transmitted from the mobile device 100 and demodulated by the engine switch 500. The setting constant acquisition unit 202 acquires a constant (hereinafter referred to as "setting constant information") that is set for an antenna matching circuit from the setting constant storage unit 204 on the basis of the usage frequency information. The antenna matching circuit is installed in the tuner 300. The setting constant acquisition unit 202 inputs the setting constant information to the tuner 300.

The setting constant storage unit 204 is connected to the setting constant acquisition unit 202. Mapping information that associates usage frequency information with setting constant information is stored in the setting constant storage unit 204.

FIG. 4 shows an example embodiment of the mapping information that is stored in the setting constant storage unit 204.

In the example embodiment shown in FIG. 4, "314.0", "315.0" are shown as pieces of the usage frequency information, and "A", "B" are respectively shown as pieces of the setting constant information corresponding to the pieces of the usage frequency information. Here, the setting constant information may be a voltage value that is applied to a variable capacitance diode of the antenna matching circuit.

In addition, mapping information that associates the usage frequency information with the setting constant information may be prepared for each vehicle.

Tuner 300

Figure 5:
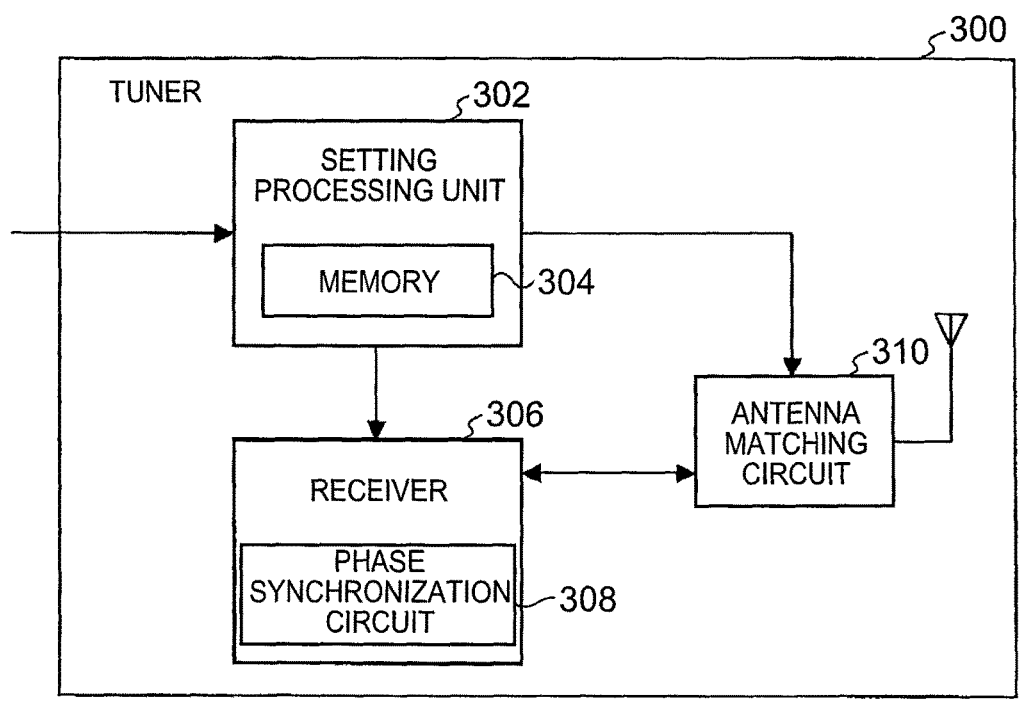
FIG. 5 is a view that shows an example embodiment of a tuner.

FIG. 5 shows an example embodiment of the tuner 300.

The tuner 300 includes a setting processing unit 302, a receiver 306 and an antenna matching circuit 310. The setting processing unit 302 includes a memory 304. The receiver 306 includes a phase synchronization circuit 308.

The usage frequency information and the setting constant information are input from the verification electronic control unit 200 to the setting processing unit 302. The setting processing unit 302 may be formed of an IC.

The setting processing unit 302 stores the usage frequency information, input from the verification electronic control unit 200, in the memory 304. The setting processing unit 302 sets the usage frequency information in the phase synchronization circuit 308 of the receiver 306. The setting processing unit 302 sets the capacitance of the variable capacitance diode included in the antenna matching circuit 310 on the basis of the setting constant information.

The memory 304 may be nonvolatile. For example, the memory 304 may be an EEPROM. The usage frequency information from the verification electronic control unit 200 is stored in the memory 304.

The receiver 306 is connected to the setting processing unit 302. The receiver 306 receives RF radio waves from the mobile device 100. The RF radio waves are input from the antenna matching circuit 310. The phase synchronization circuit 308 outputs a phase-synchronized signal on the basis of the usage frequency information from the setting processing unit 302 and a local frequency.

Figure 6:
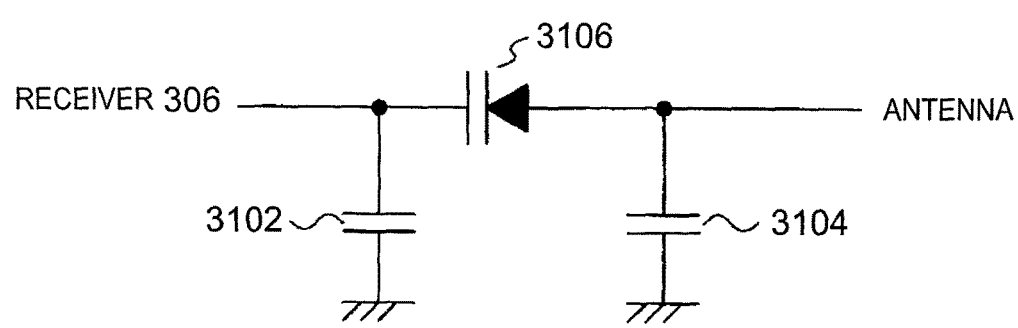
FIG. 6 is a view that shows an example embodiment of an antenna matching circuit.

FIG. 6 shows an example embodiment of the antenna matching circuit 310. FIG. 6 shows a π-type circuit as an example. Alternatively, the antenna matching circuit 310 may be an L-type circuit or a T-type circuit.

The receiver 306 is connected to a capacitor 3102 and the cathode of a variable capacitance diode 3106. The anode of the variable capacitance diode 3106 is connected to the antenna and the capacitor 3104. A terminal of the capacitor 3102, opposite to the terminal connected to the receiver 306, is grounded. A terminal of the capacitor 3104, opposite to a terminal connected to the anode of the variable capacitance diode 3106, is grounded. A voltage value that is applied to the variable capacitance diode 3106 is set by the setting processing unit 302. A voltage having the voltage value is applied to the variable capacitance diode 3106. The voltage value that is applied to the variable capacitance diode 3106 of the antenna matching circuit 310 is set and applied. Thus, the capacitance of the variable capacitance diode 3106 is set. Because the capacitance of the variable capacitance diode 3106 is set, it is possible to carry out matching between the antenna and the receiver 306.

In the tuner 300 shown in FIG. 5, the memory 304 does not need to be incorporated in the setting processing unit 302, and may be provided outside the setting processing unit 302. Alternatively, the memory 304 may be incorporated in the receiver 306.

Operation of Communication System

Figure 7:
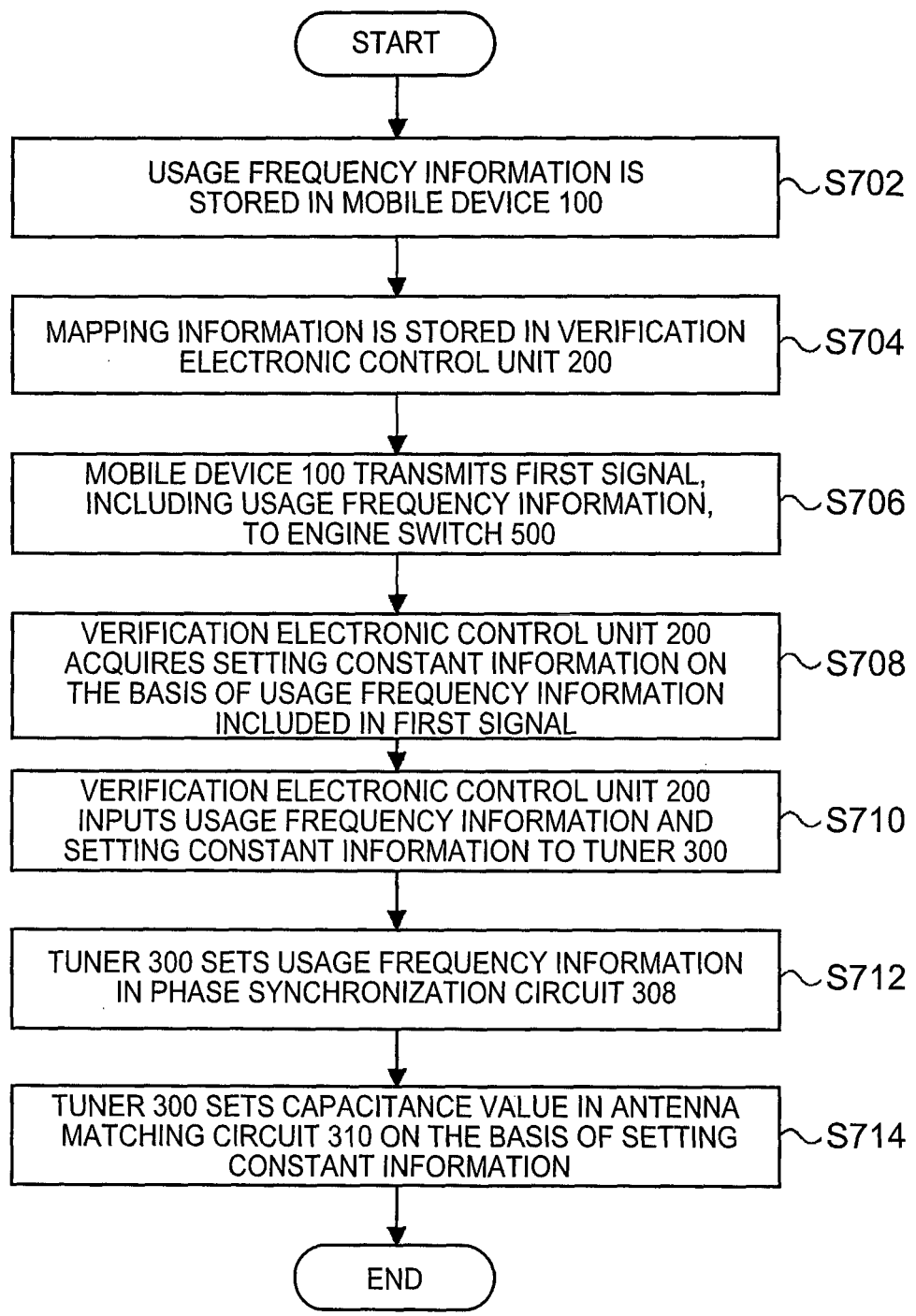
FIG. 7 is a flowchart that shows an example embodiment of the operation of the communication system.

FIG. 7 shows an example embodiment of the operation of the communication system.

In step S702, the usage frequency information is stored in the mobile device 100. The usage frequency information is stored in the memory 110 of the mobile device 100.

In step S704, the mapping information is stored in the verification electronic control unit 200. The mapping information is stored in the setting constant storage unit 204 of the verification electronic control unit 200.

In step S706, the mobile device 100 transmits the first signal including the usage frequency information to the engine switch 500. The first signal may be transmitted through user's operation of the mobile device 100. The transmission signal generating unit 108 generates the first signal including the usage frequency information stored in the memory 110, and inputs the first signal to the LF transponder response unit 102. When bidirectional communication is carried out with LF-band radio waves, the LF transponder response unit 102 modulates the first signal into the LF-band radio waves, and transmits the radio waves.

In step S708, the verification electronic control unit 200 acquires the setting constant information on the basis of the usage frequency information included in the first signal. That is, the setting constant acquisition unit 202 acquires a setting constant corresponding to the usage frequency information included in the first signal from the mapping information stored in the setting constant storage unit 204.

In step S710, the verification electronic control unit 200 inputs the usage frequency information and the setting constant information to the tuner 300.

In step S712, the tuner 300 sets the usage frequency information in the phase synchronization circuit 308. The setting processing unit 302 sets the usage frequency information in the phase synchronization circuit 308 of the receiver 306. By setting the usage frequency information in the phase synchronization circuit 308, a phase synchronization process is executed on the basis of a difference between the local frequency and the usage frequency.

In step S714, the tuner 300 sets a capacitance value in the antenna matching circuit 310. The setting processing unit 302 applies voltage to the variable capacitance diode 3106 of the antenna matching circuit 310. By applying voltage to the variable capacitance diode 3106, the capacitance value of the variable capacitance diode 3106 is set.

In FIG. 7, step S704 and step S706 are not limited to this order, and may be executed in reverse order. Step S712 and step S714 are not limited to this order, and may be executed in reverse order.

In the example embodiment of the communication system, the mobile device 100 may include an LF transmitting unit instead of the LF transponder response unit 102. The transmission signal generating unit 108 inputs the first signal to the LF transmitting unit. The LF transmitting unit is connected to the mobile device control unit 106. The LF transmitting unit modulates the first signal, input from the mobile device control unit 106, into LF-band radio waves, and wirelessly transmits the radio waves via the transmission antenna. The LF transmitting unit may be used at the time when the mobile device 100 is cataloged in the in-vehicle electronic device 400.

With the example embodiment of the communication system, at the time when the mobile device 100 is set for the in-vehicle electronic device 400, the first signal including the usage frequency information is wirelessly transmitted with the LF-band wireless signal from the mobile device 100.

The in-vehicle electronic device 400 that has received the first signal from the mobile device 100 acquires the setting information corresponding to the usage frequency information in the verification electronic control unit 200. The setting information includes the voltage value that is applied to the variable capacitance diode included in the antenna matching circuit. The verification electronic control unit 200 inputs the usage frequency information and the setting constant to the tuner 300.

The tuner 300 sets the usage frequency information, input from the verification electronic control unit 200, in the phase synchronization circuit of the receiver. The tuner 300 sets the capacitance value of the antenna matching circuit on the basis of the setting information from the verification electronic control unit 200.

In this way, because it is possible to set the antenna matching circuit and the receiver on the basis of the usage frequency information from the mobile device 100, it is not necessary to prepare the tuner for each usage frequency, so it is possible to reduce part numbers for tuners. That is, it is not necessary to manufacture tuners for each destination, each vehicle model and each frequency, so it is possible to reduce cost. In addition, setting is carried out on the basis of the usage frequency information from the mobile device 100, so setting is possible even when the in-vehicle electronic device is located at a place other than a destination, so it is advantageous in handling.

Without conducting special work at a factory or a dealer, it is possible to set the antenna matching circuit and the receiver on the basis of the usage frequency information from the mobile device 100.

Alternative Example Embodiment

An modification example embodiment of the communication system is that both or one of the capacitor 3102 and the capacitor 3104 is configured to be variable in addition to the variable capacitance diode 3106 included in the antenna matching circuit 310. Here, the case where the capacitances of both the capacitors are configured to be variable will be described as an example. The same applies to the case where the capacitance of one of the capacitors is configured to be variable.

When the capacitances of both the capacitors are configured to be variable, variable capacitance diodes may be used.

Setting constants respectively corresponding to the three variable diodes are stored as the setting constant information in the mapping information stored in the memory 304 of the verification electronic control unit 200.

FIG. 8 shows an example embodiment of the setting constant storage unit 204.

In the example shown in FIG. 8, "314.0", "315.0" are shown as the pieces of the usage frequency information.

"$\alpha 1$", "$\alpha 2$", "$\alpha 3$" are shown as pieces of the setting constant information corresponding to the usage frequency information "314.0". The pieces of setting constant information "$\alpha 1$", "$\alpha 2$", "$\alpha 3$" may be voltage values that are respectively applied to the three variable capacitance diodes when the usage frequency is 314.0.

"$\beta 1$", "$\beta 2$", "$\beta 3$" are shown as pieces of the setting constant information corresponding to the usage frequency information "315.0". The pieces of setting constant information "$\beta 1$", "$\beta 2$", "$\beta 3$" may be voltage values that are respectively applied to the three variable capacitance diodes when the usage frequency is 315.0.

In the above-described modification example embodiment, when values, which are configured to be variable, of elements included in the antenna matching circuit may be set on the basis of the usage frequency information.

According to the modification example embodiment of the communication system, it is possible to set the capacitances of the plurality of capacitors included in the antenna matching circuit on the basis of the usage frequency information, so it is possible to improve the accuracy of antenna matching. Therefore, it is possible to improve the quality of receiving a wireless signal from the mobile device 100.

The invention is described with reference to the specific example embodiments and modification example embodiment; however, the example embodiments and the modification example embodiment are only illustrative. Persons skilled in the art understand various modification example embodiments, alteration example embodiments, alternative example embodiments, replacement example embodiments, and the like. For the sake of convenience of description, the devices according to the example embodiments of the invention are described with reference to the functional block diagrams, and such devices may be implemented by hardware, software or a combination of them. The invention is not limited to the above-described example embodiments; the invention also encompasses various modification example embodiments, alteration example embodiments, alternative example embodiments, replacement example embodiments, and the like, without departing from the scope of the invention.

The invention claimed is:

1. A communication system comprising:
   a mobile device including:
   a signal generating unit configured to generate a first signal,
   a low frequency (LF) transponder response unit configured to modulate the first signal into LF-band radio waves and wirelessly transmit the first signal generated by the signal generating unit, the first signal including frequency information that is used in wireless communication between the mobile device and a tuner;

a radio frequency (RF) transmitting unit configured to modulate a response signal into RF-band radio waves and wirelessly transmit the response signal;

the tuner including a setting processing unit configured to set a receiving frequency of an antenna and a demodulation frequency of a phase synchronization circuit, the setting processing unit being configured to set the receiving frequency and the demodulation frequency on the basis of the frequency information included in the first signal from the mobile device;

a setting information acquisition unit configured to acquire setting information corresponding to the frequency information, the frequency information being included in the first signal received by an engine switch, wherein the setting processing unit is configured to set the receiving frequency of the antenna on the basis of the setting information acquired by the setting information acquisition unit; the engine switch is configured to carry out bidirectional communication with the LF-band radio waves; and the LF transponder response unit is configured to carry out bidirectional communication with the engine switch when the mobile device is initially cataloged in an in-vehicle electronic device, and the first signal is transmitted from the mobile device to the in-vehicle electronic device when the mobile device is initially cataloged in the in-vehicle electronic device.

2. The communication system according to claim 1, wherein the tuner includes a matching circuit configured to carry out matching between the antenna and a receiver, and the setting processing unit is configured to set a receiving frequency of the matching circuit.

3. The communication system according to claim 2, wherein the matching circuit includes a variable capacitance diode, and the setting processing unit is configured to set a voltage that is applied to the variable capacitance diode of the matching circuit.

4. A tuner that carries out wireless communication with a mobile device, comprising:

a setting processing unit configured to set a receiving frequency of an antenna and a demodulation frequency of a phase synchronization circuit on the basis of frequency information that is used in wireless communication between the mobile device and the tuner, the frequency information being included in a first signal from the mobile device;

a setting information acquisition unit configured to acquire setting information corresponding to the frequency information, the frequency information being included in the first signal received by an engine switch, wherein the setting processing unit is configured to set the receiving frequency of the antenna on the basis of the setting information acquired by the setting information acquisition unit, the mobile device includes a signal generating unit configured to generate the first signal, a low frequency (LF) transponder response unit configured to modulate the first signal into LF-band radio waves and wirelessly transmit the first signal generated by the signal generating unit, and a radio frequency (RF) transmitting unit configured to modulate a response signal into RF-band radio waves and wirelessly transmit the response signal, the engine switch is configured to carry out bidirectional communication with the LF-band radio waves, and the LF transponder response unit is configured to carry out bidirectional communication with the engine switch when the mobile device is initially cataloged in an in-vehicle electronic device, and the first signal is transmitted from the mobile device to the in-vehicle electronic device when the mobile device is initially cataloged in the in-vehicle electronic device.

5. A setting method for a communication system including a mobile device and a tuner, comprising:

generating a first signal with a use of a low frequency (LF) transponder response unit of the mobile device, the first signal including frequency information that is used in wireless communication between the mobile device and the tuner;

wirelessly transmitting the first signal with the use of a radio frequency (RF) transmitting unit of the mobile device;

setting a receiving frequency of an antenna and a demodulation frequency of a phase synchronization circuit on the basis of the frequency information with the use of the tuner, the frequency information being included in the first signal from the mobile device; and acquiring setting information corresponding to the frequency information, the frequency information being included in the first signal received by an engine switch, wherein the receiving frequency of the antenna is set on the basis of the acquired setting information, bidirectional communication with LF-band radio waves is carried out by the engine switch, and bidirectional communication with the engine switch is carried out by the LF transponder response unit when the mobile device is initially cataloged in an in-vehicle electronic device, and the first signal is transmitted from the mobile device to the in-vehicle electronic device when the mobile device is initial cataloged in the in-vehicle electronic device.

* * * * *